UNITED STATES PATENT OFFICE.

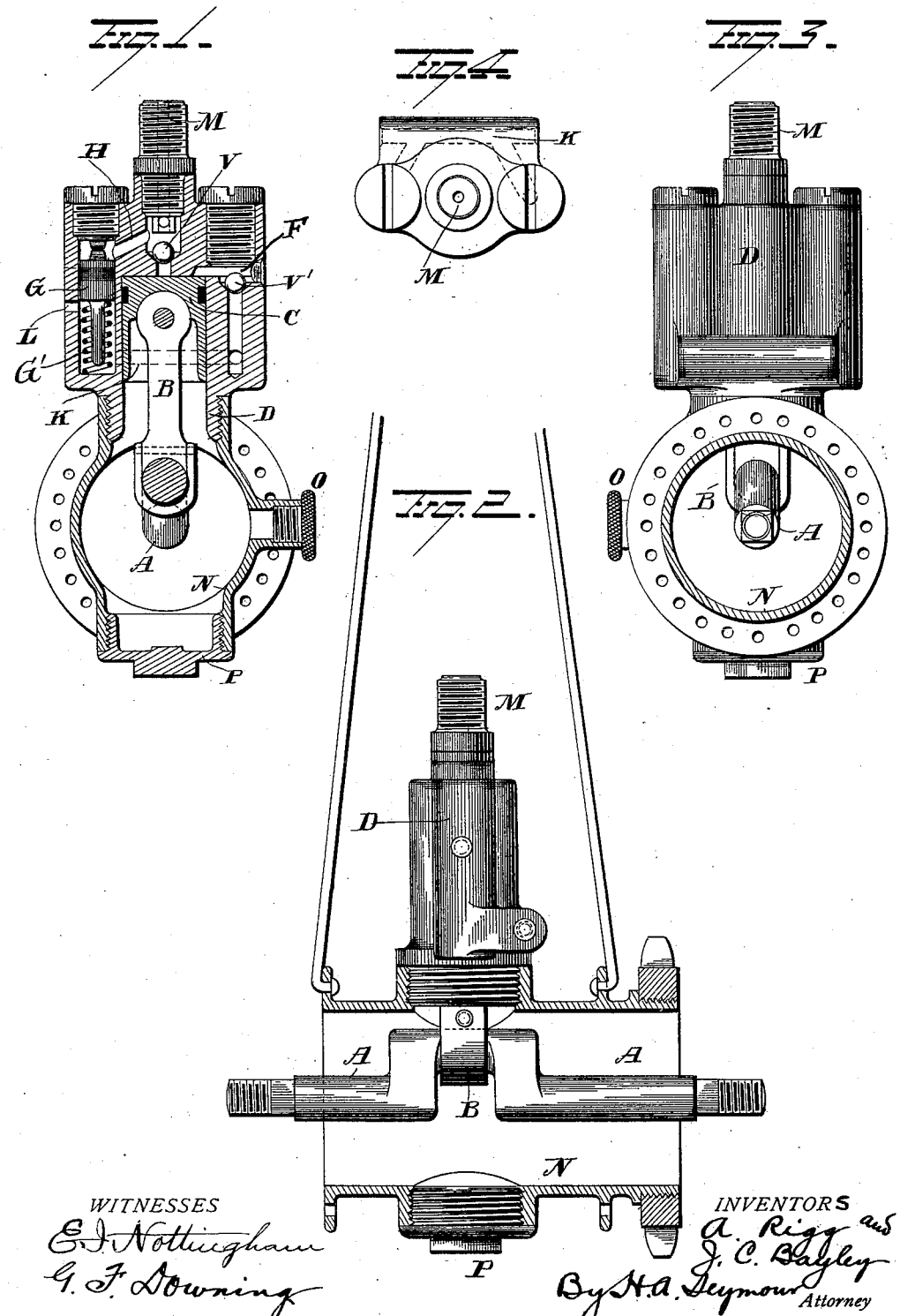

ARTHUR RIGG AND JOHN CLOWES BAYLEY, OF LONDON, ENGLAND.

AIR-PUMP FOR PNEUMATIC TIRES.

SPECIFICATION forming part of Letters Patent No. 599,794, dated March 1, 1898.

Application filed October 8, 1897. Serial No. 654,552. (No model.)

*To all whom it may concern:*

Be it known that we, ARTHUR RIGG and JOHN CLOWES BAYLEY, of the city of London, England, have invented certain new and useful Improvements in Air-Pumps for Pneumatic Tires; and we do hereby declare the following to be a full, clear, and exact description of the invention, such as will enable others skilled in the art to which it appertains to make and use the same.

Our invention relates to an improvement in means for inflating pneumatic tires; and it consists in the combination, with a vehicle having a wheel provided with a pneumatic tire, of a pump connected with the tire and mounted on the vehicle, so as to be operated thereby.

Our invention also consists in the combination, with a vehicle having a wheel provided with a pneumatic tire, of a pump connected with said tire and mounted on the wheel, so as to be operated automatically when said wheel is revolved.

In the accompanying drawings, Figure 1 is a sectional view illustrating our invention. Fig. 2 is an elevation of the pump with the hub of the wheel in section to show the crank arrangement. Fig. 3 is an elevation, partly in cross-section. Fig. 4 is a plan view of the pump.

The class of tire to which our invention is intended to be applied is that generally used on bicycles and other vehicles, known as "pneumatic" tires, wherein air is pumped to any desired degree of compression.

For the proper carrying out of our invention it is not necessary to alter existing inlet arrangements, as these may be connected to the delivery of our pump, which is fixed upon the hub or center of the wheel to which it is applied.

The hub in its middle part, between the points of attachment for the wire tension-spokes, consists usually of a plain cylinder or tube, sometimes occupied as an oil-reservoir, which is a feature suitable for use with our invention. The hub turns around the same center as a spindle within it, which does not generally rotate. In some machines, however, where gearing is introduced, the spindle serves as a crank-shaft to carry the treadles, and in such cases it turns around, but at a different rate to the hub and wheel. Our invention is applicable in both these cases where there is a difference in velocity between the hub and central spindle. Having made these preliminary observations, we will proceed to describe our invention so far as a reciprocating pump is concerned.

Beginning with the fixed central spindle A, (which, however, may have a speed of rotation differing from that of the hub,) we add an eccentric, or construct it in the form of a crank, whose center line will be in line with the center of our pump D and conveniently symmetrical in the center line of the wheel also. It is this crank or eccentric which drives our pump in such cases where direct driving is used; but gearing may be employed on the crank-lever placed outside. A cross-slide or connecting-rod B, attached at one end to the crank and at the other end to a plunger C, completes this portion of the reciprocating mechanism. Occupying a corresponding position in the center line of this plunger we attach to the hub a cylinder fitting the plunger, of suitable length. Thus the result of the common revolution of plunger and cylinder around the crank is to produce a reciprocating stroke as between the cylinder and plunger, just as a crank turning around would produce in any ordinary pump of corresponding size. The addition of inlet-valve V' and delivery-valve V to the cylinder completes the apparatus, which forthwith pumps air whenever the wheel rotates.

It would not, however, do to leave this pump in constant operation, or the pressure in the tire connected to it would become excessive, and to prevent this we add a safety-valve for controlling the operations of this air-pump, so that it shall only operate at such times as air-pressure in the tire sinks below a prearranged amount and shall cease pumping when the air-pressure becomes normal. Thus the air-pump becomes automatic and independent of any attention on the part of the rider, except that it may be arranged so that at any time the rider is inclined to do so he may alter the normal pressure in the tire of his bicycle or other vehicle. There are several methods by which this object may be accomplished and we will now proceed to describe one of them.

In order to make our pump automatic or self-acting as to its periods of activity or repose, we provide a small piston G, held up by a spring G' of suitable strength, which spring may be fixed to any desired tension or may be adjusted by hand, so as to vary the normal pressure in the tire. On the opposite side, or the same side of piston when the spring is used in tension, we admit air-pressure through a passage H from above the pump-delivery valve V or from inside the tire. Whenever therefore there is sufficient pressure to overcome the spring, the piston G moves in one direction, and whenever such pressure reduces then the piston is moved by the spring in the other direction. These movements may be utilized in several ways, so as to start the pump into activity or cause it to cease working. We prefer using the movement, however, to close or open the inlet L for air to the suction-valve, so that although the plunger still continues to reciprocate while its air-inlet is closed no air will be drawn in and none therefore enters the tire. The piston G may be also made to close a passage K, which connects the cylinder of said plunger with the suction-valve passage F, through which air is conducted to the main cylinder, said passage being provided with the valve V'. Whenever the tire-pressure reduces sufficiently, the spring finds less resistance and reopens the atmospheric inlet-port, so that the pump resumes action until the inflation of the tire reaches its normal amount, and then its action ceases automatically without requiring any attention from the rider.

Should it be desired to divide the work upon both feet—in the case of a bicycle or tricycle, for example—or to equalize the strain of pumping throughout a circle or revolution, two or three independent pumps may be used and driven from the same crank, or else two pumps of different area may be used and of the same piston strokes. For the latter-named case air would first be drawn into the larger pump and compressed into the opposite smaller barrel, which in its turn compresses its contents still further through the delivery-valve and into the tire, its final destination. A piston or plunger and spring of similar construction to that already described in connection with the atmospheric inlet will serve any of these pumps as regulator of their stopping and starting whenever the normal pressure in the tire becomes diminished or exceeded.

It will be understood that many modifications might be made in the details of construction, or even pumps of the rotary class be used instead of the reciprocating pumps described. Such differences do not, however, affect the general features of our invention, which consists of utilizing the different velocities of central shaft and hub to drive an air-pump for filling up the pneumatic tires of bicycles and other vehicles, this also in combination with the mechanism described or its equivalent for rendering the air-pump automatic in its action to start it working when the air-pressure falls below a certain amount and cause it to cease working when the pressure rises above an arranged amount.

The pump can be connected with the inlet-valve of the tire by means of a tube or pipe attached at one end thereto and at the other end to the pump at M. The interior N of the hub forms an oil-receptacle to which access may be had through an oiling-hole O. The hub is also provided with a large plugged opening P, through which access may be had to the crank-shaft and connecting-rod.

Various slight changes might be made in the details of construction of our invention without departing from the spirit thereof or limiting its scope, and hence we do not wish to limit ourselves to the precise details herein set forth.

Having fully described our invention, what we claim as new, and desire to secure by Letters Patent, is—

1. The combination with a vehicle having a wheel provided with a pneumatic tire, of a pump connected with the vehicle and with the tire, said pump being provided with an inlet-port, a passage between said inlet-port and the cylinder of the pump, a valve in said passage, a valve for closing the inlet-port, a passage for conducting air from the tire to said last-mentioned valve, and a valve between said last-mentioned passage and the pump-cylinder, substantially as set forth.

2. The combination with a vehicle having a wheel provided with a pneumatic tire, of a pump connected with the vehicle and with the tire, said pump having a valve-chamber, an inlet-port communicating with said valve-chamber, a passage communicating with said valve-chamber and the pump-cylinder, a valve in said passage, a spring-pressed valve in said valve-chamber and adapted to close communication between the inlet-port and said passage, a passage adapted to communicate with said valve-chamber and the tire and a valve between the last-mentioned passage and the pump-cylinder, substantially as set forth.

In testimony whereof we have signed this specification in the presence of two subscribing witnesses.

ARTHUR RIGG.
JOHN CLOWES BAYLEY.

Witnesses:
ARTHUR TRAVIS SMITH,
SIDNEY HUGH FROMINGS.